United States Patent
Schpok

(10) Patent No.: US 11,157,530 B2
(45) Date of Patent: *Oct. 26, 2021

(54) AUTOMATIC GENERATION OF GEOGRAPHIC IMAGERY TOURS

(71) Applicant: Google Inc., Mountain View, CA (US)

(72) Inventor: Joshua S. Schpok, Milpitas, CA (US)

(73) Assignee: Google LLC, Mountain View, CA (US)

( * ) Notice: Subject to any disclaimer, the term of this patent is extended or adjusted under 35 U.S.C. 154(b) by 501 days.

This patent is subject to a terminal disclaimer.

(21) Appl. No.: 15/717,424

(22) Filed: Sep. 27, 2017

(65) Prior Publication Data

US 2018/0075062 A1  Mar. 15, 2018

Related U.S. Application Data

(63) Continuation of application No. 14/054,334, filed on Oct. 15, 2013, now Pat. No. 9,805,057.

(51) Int. Cl.
| | | |
|---|---|---|
| G06F 16/20 | (2019.01) | |
| G06F 16/29 | (2019.01) | |
| G06F 16/58 | (2019.01) | |

(52) U.S. Cl.
CPC ............. *G06F 16/29* (2019.01); *G06F 16/58* (2019.01)

(58) Field of Classification Search
None
See application file for complete search history.

(56) References Cited

U.S. PATENT DOCUMENTS

| | | |
|---|---|---|
| 8,200,712 B2 | 6/2012 | Koch et al. |
| 8,326,048 B2 | 12/2012 | Ofek et al. |
| 9,152,726 B2 * | 10/2015 | Lymperopoulos ........................ G06F 16/9537 |
| 9,311,416 B1 | 4/2016 | Goel |
| 2008/0033641 A1 | 2/2008 | Medalia |
| 2008/0201227 A1 * | 8/2008 | Bakewell ............... G06Q 30/02 705/14.19 |
| 2009/0106681 A1 | 4/2009 | Gupta et al. |
| 2009/0216435 A1 | 8/2009 | Zheng et al. |
| 2010/0009700 A1 | 1/2010 | Camp, Jr. et al. |
| 2011/0113315 A1 | 5/2011 | Datha et al. |
| 2011/0283223 A1 * | 11/2011 | Vaittinen ............ G01C 21/3647 715/781 |

(Continued)

OTHER PUBLICATIONS

"Calais Integration for Alfresco/Geo-Tagging/FiexSpaces Part 2," (2008). Retrieved from the Internet on May 21, 2013: URL:http://integratedsemantics.org/2008/12/08/calais-integration-for-alfresco-geo-tagging-flexspaces-part-2/.

(Continued)

*Primary Examiner* — Belix M Ortiz Ditren
(74) *Attorney, Agent, or Firm* — Lerner, David, Littenberg, Krumholz & Mentlik, LLP

(57) ABSTRACT

An indication of a geographic area is received. Respective metrics of noteworthiness are obtained for multiple entities located in the geographic area. Using a machine-readable knowledge repository that describes semantic relations between the entities, several of the entities are selected in view of the corresponding metrics of noteworthiness, so that the selected entities share a set of attributes defining a commonality, and so that digital imagery is available for each of the selected entities. This commonality is not specified by the user. A geographic imagery tour that includes a representation of the respective digital imagery for the selected entities is generated.

20 Claims, 9 Drawing Sheets

(56) References Cited

U.S. PATENT DOCUMENTS

| | | | |
|---|---|---|---|
| 2012/0331416 A1 | 12/2012 | Barcay et al. | |
| 2013/0275886 A1 | 10/2013 | Haswell et al. | |
| 2014/0088861 A1* | 3/2014 | Nash | G06F 16/29 701/426 |
| 2014/0188851 A1* | 7/2014 | Chavez | G06F 16/9537 707/722 |
| 2014/0204085 A1* | 7/2014 | Stroila | G01C 21/32 345/420 |

OTHER PUBLICATIONS

"Photosynth for Windows Phone 8 is Here!," (2013). Retrieved from the Internet on May 21, 2013: URL:http://blogs.msdn.com/b/photosynth/archive/2013/02/28/photosynth-for-windows-phone-8-is-here.aspx.

Adabala et al., "An Interactive Multimedia Framework for Digitial Heritage Narratives," ACM (2010).

Agarwal et al., "Building Rome in a Day," Communications of the ACM, 54(10):105-112 (2011).

Becker et al., "DBpedia Mobile: A Location-Enabled Linked Data Browers," LDOW (2008).

Deng et al., "ImageNet: A Large-Scale Hierarchical Image Database," (2009).

Russell et al., "LabelMe: A Database and Web-Based Tool for Image.," International Journal of Computer Vision, 77(1-3):157-173 (2008).

Snavely et al., "Photo Tourism: Exploring Photo Collections in 3D," (2006).

Snavely et al., "Modeling the World from Internet Photo Collections" Int J Comput Vis, 80(2):189-210 (2008).

Taneva et al., "Finding Images of Rare and Ambiguous Entities," (2011).

Taneva et al., "Gathering and Ranking Photos of Named Entities with High Precision, High Recall, and Diversity," ACM, pp. 431-440 (2010).

Torralba et al., "80 Million Tiny Images: A Large Dataset for Non-Parametric Object and Scene Recognition," IEEE Transactions on Pattern Analysis and Machine Intelligence (2008).

* cited by examiner

AUTOMATIC GENERATION OF GEOGRAPHIC IMAGERY TOURS

CROSS REFERENCE TO RELATED APPLICATIONS

The present application is a continuation of U.S. patent application Ser. No. 14/054,334, filed Oct. 15, 2013, the disclosure of which is hereby incorporated herein by reference.

FIELD OF TECHNOLOGY

The present disclosure relates generally to virtual tours and, more particularly, to the automatic generation of imagery tours which include geographically related content.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, users can go on virtual tours of places around the world using a web browser, for example. For example, a user can access a virtual tour of a famous art museum in which various information about the museum, images of painting, video walkthroughs of exhibits, audio clips of appropriate music, etc. are presented in a sequential or narrative form. However, the generation of such tours currently requires extensive and direct human interaction and guidance from individuals with relevant domain experience (individuals who are computer literate, proficient at authoring tours, etc.). Often, these individuals must manually search for appropriate content, modify or label content, define sequences, and arrange or place content. As such, the creation of virtual tours is labor- and time-intensive, thus limiting the number and/or the quality of tours that can be generated.

SUMMARY

Generally speaking, a system automatically generates semantically deep geographic imagery tours of landmarks, monuments, businesses, museums, or other entities related to the current view of a digital map and, in some cases, in view of other factors that define the geographic context. The factors can include user's preferences, time of day, recent events related to the geographic area in the current view, geographic locations visited or reviewed by a user's friends, etc. The system can "synthesize" the tours by analyzing semantic relations between entities matching the geographic context and selecting groups of candidate entities that share a commonality. The size of the group can be configured to be between three and eight entities or can be determined based on tour duration, for example. As a more specific example, the system can automatically generate the tour "Ruins of Ancient Rome" as a particular sequence of brief virtual visits to five locations in Rome which the system identifies as including ruins, as being related to Ancient Rome, as being a site for which digital imagery is available, etc. Each visit can include display of digital imagery such as photographs, videos, and three-dimensional (3D) model, for example. To select entities for a group from among various candidates, the system can compare candidate entities using respective metrics of noteworthiness, which can be numerical scores that reflect the probability that a user would find the entity "tourable." These metrics can be generated in view of the types of entities, frequency of reported visits, user ratings, and other factors. Further, the system can temporarily raise or lower the scores of candidate entities according to their relevance to current events. Still further, low-scored entities may be combined to form higher-scored entities. When multiple groups of semantically linked, high-scoring, and content-rich entities are available for a specified geographic context, the system can rank the groups according to the level of specificity, so that tours that are focused on a specific theme or subject are offered to the user before the more broad tours.

More particularly, one embodiment of these techniques is a method in a computing system for automatically generating geographic imagery tours. The method includes receiving an indication of a geographic area and obtaining respective metrics of noteworthiness for entities located in the geographic area. The method also includes selecting several of the entities that share a set of attributes defining a commonality, and such that digital imagery is available for each of the selected entities, using a machine-readable knowledge repository that describes semantic relations between the plurality of entities. The selection is made in view of the corresponding metrics of noteworthiness. The commonality is not specified by a user. The method further includes generating a geographic imagery tour that includes a representation of the respective digital imagery for the selected entities. These acts are executed by one or more processors.

Another embodiment is a method in a computing device for providing virtual tours of geographic imagery. The method includes determining a geographic context of the computing device, such that the geographic context includes a selection of a geographic area. The method further includes transmitting an indication of the geographic context to a server via a communication network, receiving from the server descriptions of available geographic imagery tours in response to the indication of the geographic context, where each geographic imagery tour includes a representation of respective digital imagery for several entities that share a commonality and that correspond to the geographic context, and receiving, via a user interface of the computing device, a selection of one of the available geographic imagery tours. The method also includes retrieving content for the selected geographic imagery tour from the server and providing the content of the selected geographic imagery tour via the user interface. These acts also are executed by one or more processors.

Yet another embodiment is a non-transitory computer-readable medium storing instructions for automatically generating geographic imagery tours. When executed by one or more processors, the instructions are configured to receive an indication of a geographic context, including a selection of a geographic area. The instructions are further configured to use a machine-readable knowledge repository in which data that describes attributes of entities is organized according to semantic relations between the entities to automatically select a group of entities satisfying conditions of (i) corresponding to the geographic context, (ii) having references to related digital imagery in the knowledge repository, and (iii) sharing a set of one or more attributes that define a commonality. The group of entities is selected from among candidate entities matching the conditions (i)-(iii) in view of metrics of noteworthiness of the entities, without receiving a selection of the commonality from a user. The instructions are further configured to generate a geographic imagery tour that includes a representation of the respective digital imagery for the selected group of entities.

DETAILED DESCRIPTION

A system of the present disclosure automatically generates geographic imagery tours using a knowledge base in which information is organized around semantic principles. Each tour can include a sequence of brief virtual visits of places or exhibits. Each visit can include displaying digital imagery, displaying text, playing back music or an audio narration, etc. Typically, content related to only one visit is displayed at any one time. For a given geographic area, the knowledge base may store information for a variety of geographic entities, such as landmarks, monuments, businesses, museums, etc. The data stored for each geographic entity can include geographic coordinates, a visual representation of the entity (a photograph, a video), a description of the entity, and various attributes via which the entity can be semantically linked to other entities. Further, for at least some of these geographic entities, the system can access data from which a metric of noteworthiness can be derived. Examples of such data include an indication of a type of the geographic entity (e.g., individual business, restaurant, museum, amusement park), user rating, information about the number of visits, etc.

A system generates geographic imagery tours automatically, without receiving tour parameters from the user. Depending on the implementation, the system can generate tours based on the geographic context that includes only the viewport or further includes, in some embodiments, the user's profile, her recent searches, etc. (in such cases, the embodiments may require that, in order to use this information, the user select certain settings and/or install certain applications). In general, the system can generate geographic imagery tours based on the real-time geographic context. To offer a better variety and flexibility, the system can generate tours dynamically in response to receiving a new geographic context. In this manner, the system can generate a geographic imagery tour related to a relatively recent event (e.g., the venues of yesterday's Blues Festival). Moreover, the system can dynamically adjust a previously defined tour when the user adjusts the viewport.

System Overview

Figure 1:
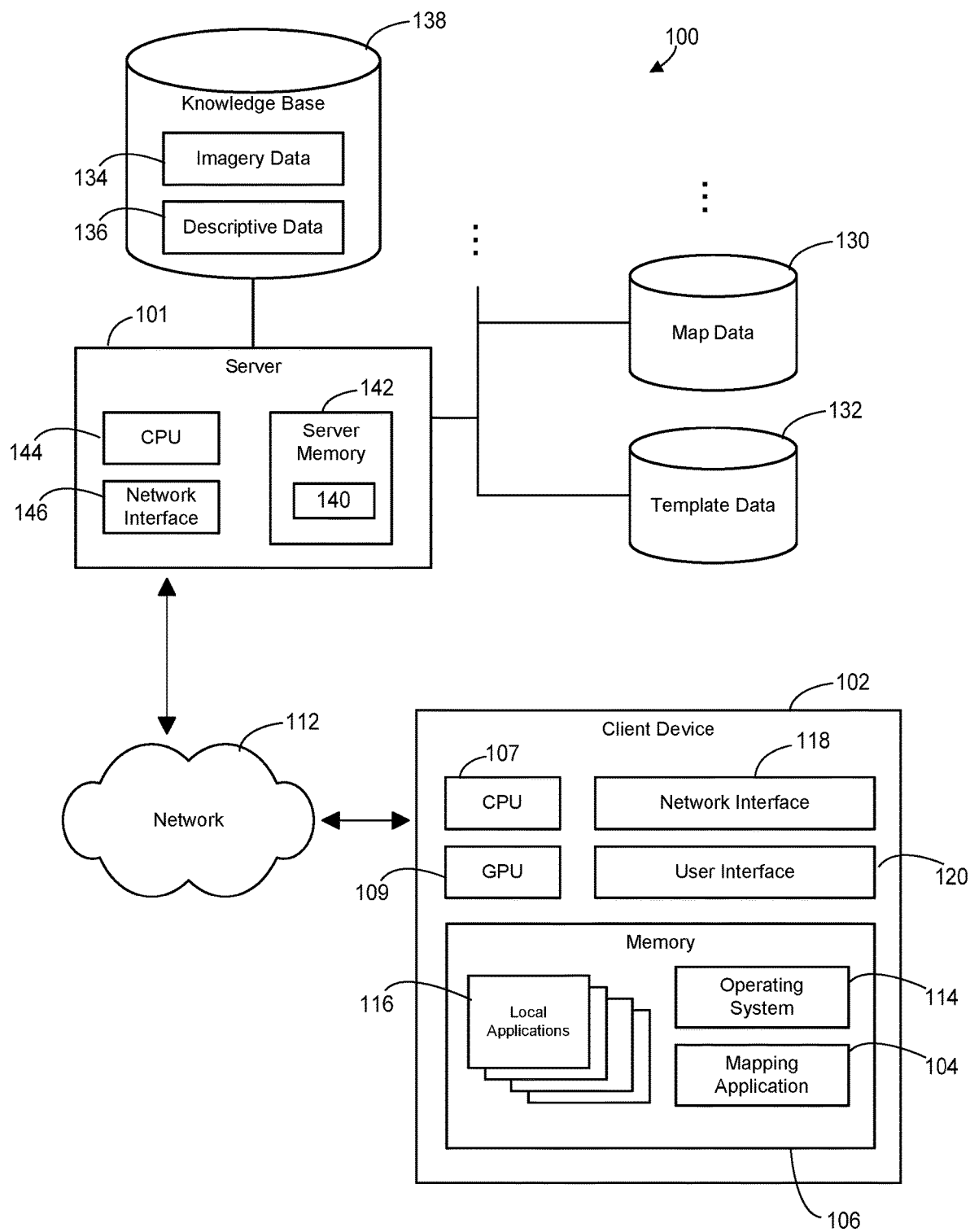
FIG. 1 illustrates an example computing system in which a server may automatically generate semantically meaningful imagery tours to for display on a client device.

FIG. 1 illustrates an example computing environment 100 in which a server 101 automatically generates geographic imagery tours for presentation on a client device 102. The client device 102 can present these tours in a mapping application 104, which is stored in memory 106 as a set of instructions and executes on a CPU 107 and/or a graphic processing unit (GPU) 109. The mapping application 104 in general can display digital map content supplied by the server 101 via a network 112, which can be a wired or wireless network (e.g., the Internet). For example, the mapping application 104 may be a special-purpose application available at an online application store disposed at the server 101 or an application server (not shown). A user of the client device 102 may retrieve a copy of the mapping application 104 from the application server and install the retrieved copy of the mapping application on the client device 102. In other implementations, the mapping application 104 can be a software component, such as a plug-in, that operates in a web browser (e.g., Google Chrome® or Apple's Safari®) or another application.

The memory 106 may be tangible, non-transitory memory and may include any types of suitable memory modules, including random access memory (RAM), read-only memory (ROM), a hard disk drive, flash memory, or other types of memory. In addition to the mapping application 104, the memory 106 stores an operating system (OS) 114 and one or more local applications 116 or modules. The operating system 114 may be any type of suitable operating system. The one or more local applications 116 may include a variety of installed applications. The applications 116 and the mapping application 104 can receive digital content via a network interface 118. A user can interact with the applications 104 and 116 via a user interface 120, which can include a touchscreen, a screen along with a keyboard and a mouse, speakers, etc.

In general, the client device 102 can be any suitable portable or non-portable computing device. By way of example, the client device 102 may be a smartphone, a tablet computer, a laptop computer, etc. In various implementation, the client device 102 can include fewer components than illustrated in FIG. 1 or, conversely, additional components. In some implementations, for example, the client device 102 includes multiple instances of the CPU 107.

Figure 7:
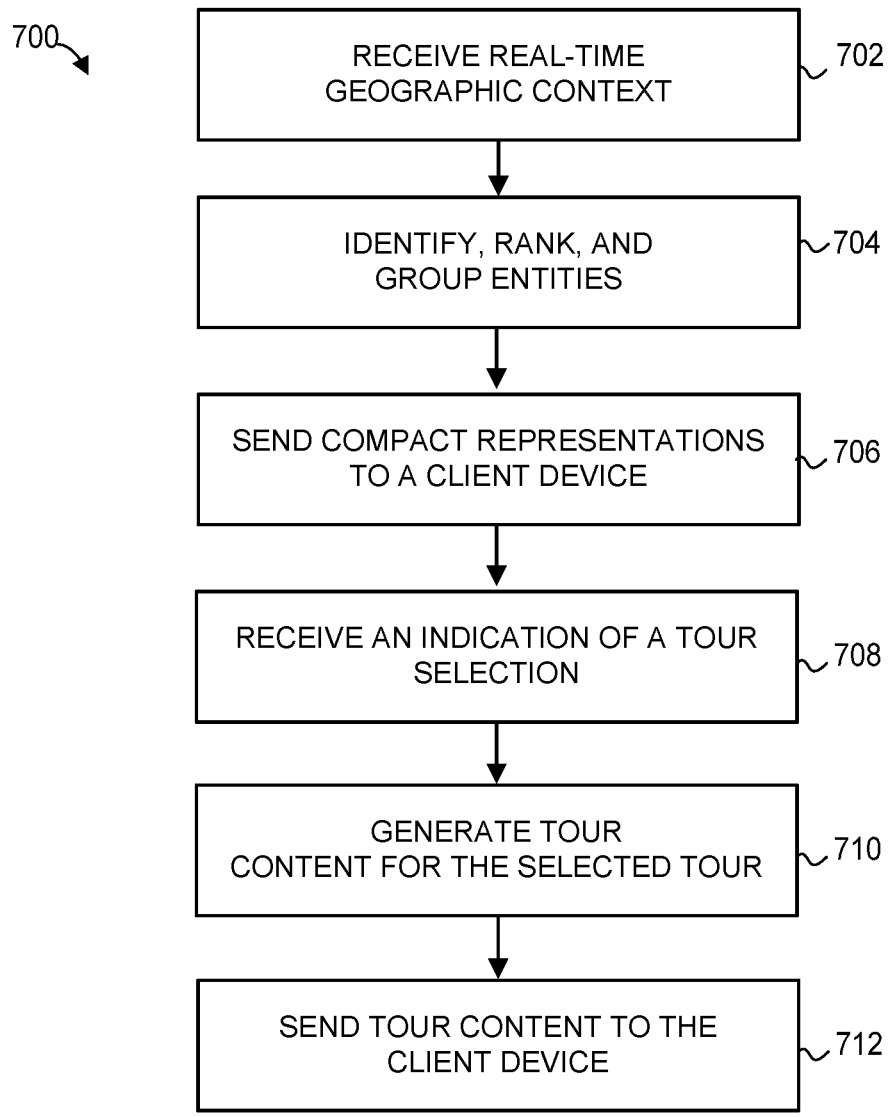
FIG. 7 is a flow diagram of an example method for automatically generating semantically meaningful imagery tours, which can be implemented in the server operating in the system of FIG. 1.

The server 101, from which the client device 102 receives imagery tours, may be communicatively coupled to multiple databases such as (i) a map database 130 storing map data that can include street and road information, topographic data, satellite imagery, information related to public transport routes, information about businesses or other points of interest (POIs), information about current traffic conditions, etc., and (ii) a template database 132 storing templates for automatically generating labels and descriptions of objects within semantically meaningful imagery tours, as will be discussed further with reference to FIG. 7. The map data can be stored in the map database 130 in a vector graphics format, a raster format, or both. In general, the server 101 can receive information about geographically related objects from any number of suitable databases, web services, etc.

It will be understood that although the server 101 is illustrated in FIG. 1 as a single device, in general the server 101 can correspond to multiple servers responsible for respective types of content or respective operations. For example, the server 101 can include a server that generates geographic imagery tours and another server that provides map data to client device in response to requests. In another implementation, the server 101 includes (i) a back-end server that assigns, in a batch mode, tourability scores to entities and (ii) a front-end server that receives an indication of the current geographic context of the mapping application 104, clusters of entities into geographic tours in accordance with the current geographic context, and provides descriptions of potential tours to the client device 102.

In addition to the databases 130 and 132, the server 101 may be communicatively coupled to a knowledge base 138. The knowledge base 138 is a machine-readable repository of data or information about geographic entities (e.g., objects of interest, places, people, etc.) organized around semantic principles. By way of example, semantic principles may include geographic relationships (e.g., city, country, etc.), categorical relationships (e.g., art museums, architectural landmarks, notable restaurants, etc.), and temporal relationships (e.g., this weekend, last summer, etc.). The data or information about entities may include imagery data 134 (photographs, videos, etc.) and descriptive data 136 (text descriptions, audio narration, etc.). The descriptive data 136 can include "knowledge cards" for various entities that specify various facts, links to additional information, links to audio narrations, etc. The imagery data 134 can be stored in one or several digital formats such as JPEG or MPEG, for example. Although the knowledge base 138 is shown in FIG. 1 as storing the image data 134 and the descriptive data 136, some knowledge bases may be purely organizational databases in which relationships, or connections, between entities are defined, without storing specific digital content related to the entities.

In the illustrated implementation, the system for automatically generating geographic imagery tours includes an imagery tour generation routine 140 stored in a server memory 142 and executed by a server CPU 144. The routine 140 may automatically generate semantically meaningful imagery tours using a real-time geographic context from the client device 102 and related information in the knowledge base 138. The server 101 may send a "compact representation" of the imagery tours to the client device 102. Subsequently, in response to user input or other indications, the server 101 may send tour content to the client device 102, as described further with reference to FIG. 7. In some implementations, the imagery tour generation routine 140 may generate imagery tours without an explicit request for such tours from the client device 102. In such a case, upon receiving a compact representation of the imagery tours, a mobile device may display indications of the tours as "suggested" tours in a mapping application.

In other implementations, the system for automatically generating geographic imagery tours is implemented in the client device 102. For example, the imagery tour generation routine 140 can operate in the client device 102 and communicate with the knowledge base 138 via the communication network 112. In yet other implementations, the system for automatically generating geographic imagery tours includes both a server component generally similar to the routine 140 as well as a client component operating in the client device 102.

Overview of Automatically Generated Imagery Tours

Examples of automatically generated geographic imagery are discussed next. These techniques are discussed with continued reference to FIG. 1 as well as to FIGS. 2-6.

As indicated above, server 101 may automatically generate imagery tours based on any suitable real-time geographic context of client device 102. Moreover, the server 101 may dynamically adjust imagery tours for a current context. For example, the server 101 may use the current viewport of the mapping application 104 as a real-time geographic context, or at least as a factor in determining the real-time geographic context. The viewport may be a default viewport displayed to a user upon opening the mapping application 104, or the viewport may be a viewport to which a user has zoomed, panned, etc. (e.g., via pinch and drag gestures).

Using an indication of the current location and zoom level of the viewport received from the client device 102, the server 101 can determine that the real-time geographic context includes the displayed geographic area, an area within a certain radius of the viewport centroid, or a conceptual area (city, zip code, neighborhood, etc.) that overlaps the displayed area, depending on the implementation or scenario. In some cases, the real-time geographic context may also include the location of a mobile device (e.g., latitude and longitude), current time (e.g., hours, minutes, seconds), a detected action (e.g., driving, walking, etc.), user's preferences, assuming the user operated appropriate controls to enable the use of this data.

Using the real-time geographic context, the server 101 can query the knowledge base 138 to identify groups of "tour-able" entities for which imagery tours may be generated. For example, the identification of groups of tour-able entities may includes two operations: (1) ranking entities (e.g., POIs) matching the real-time geographic context according to a metric ("score") of noteworthiness and (2) correlating the most noteworthy entities together based on semantic relationships, or connections, defined in the knowledge base 138.

The imagery tour generation routine 140 can generate the metric of noteworthiness of a geographic entity based in part on whether visual representation of the entity is available. Moreover, the availability of special tour media, such as user-developed models or user-contributed photo tours, can contribute to a higher score. The type of the geographic entity can be another factor, so that a monument or museum is assigned a higher score than a gas station, for example. In general, tourist sites can receive higher scores than individual businesses. The type can be stored for each entity in the knowledge base 138. Further, the imagery tour generation routine 140 can adjust the metric for noteworthiness for a geographic entity according to the frequency of reported user visits (in other words, infer that the geographic entity is noteworthy if it is frequently visited). Still further, if a geographic entity is relevant to current events, the imagery tour generation routine 140 can temporarily raise the score for the entity. Yet another reason for assigning a higher score to the metric of noteworthiness can be a match between the type of the geographic entity (or other fields in the metadata) and the user's interests, if the user is logged into the mapping application 104.

In any case, the metric of noteworthiness provides a quantitative indication of suitability of a geographic for inclusion in a geographic imagery tour.

In one simple scenario, the viewport may cover a portion of the city of Los Angeles, and the server 101 may determine that twenty POIs are within that portion of Los Angeles (e.g., as determined by a query of the map database 130). The server 101 may rank the noteworthiness of the entities by assigning a score (e.g., zero to one hundred, where one hundred represents the highest notability) to each of the twenty entities within the portion of Los Angeles, for example. The server may then group together the highest ranking entities (i.e., noteworthy entities) based on information about relationships, or connections, between the entities contained in a knowledge base, in the scenario. As a more specific example, the server 101 may determine that the portion of Los Angeles contains four noteworthy art museums and three noteworthy statues or monuments.

Figure 2:
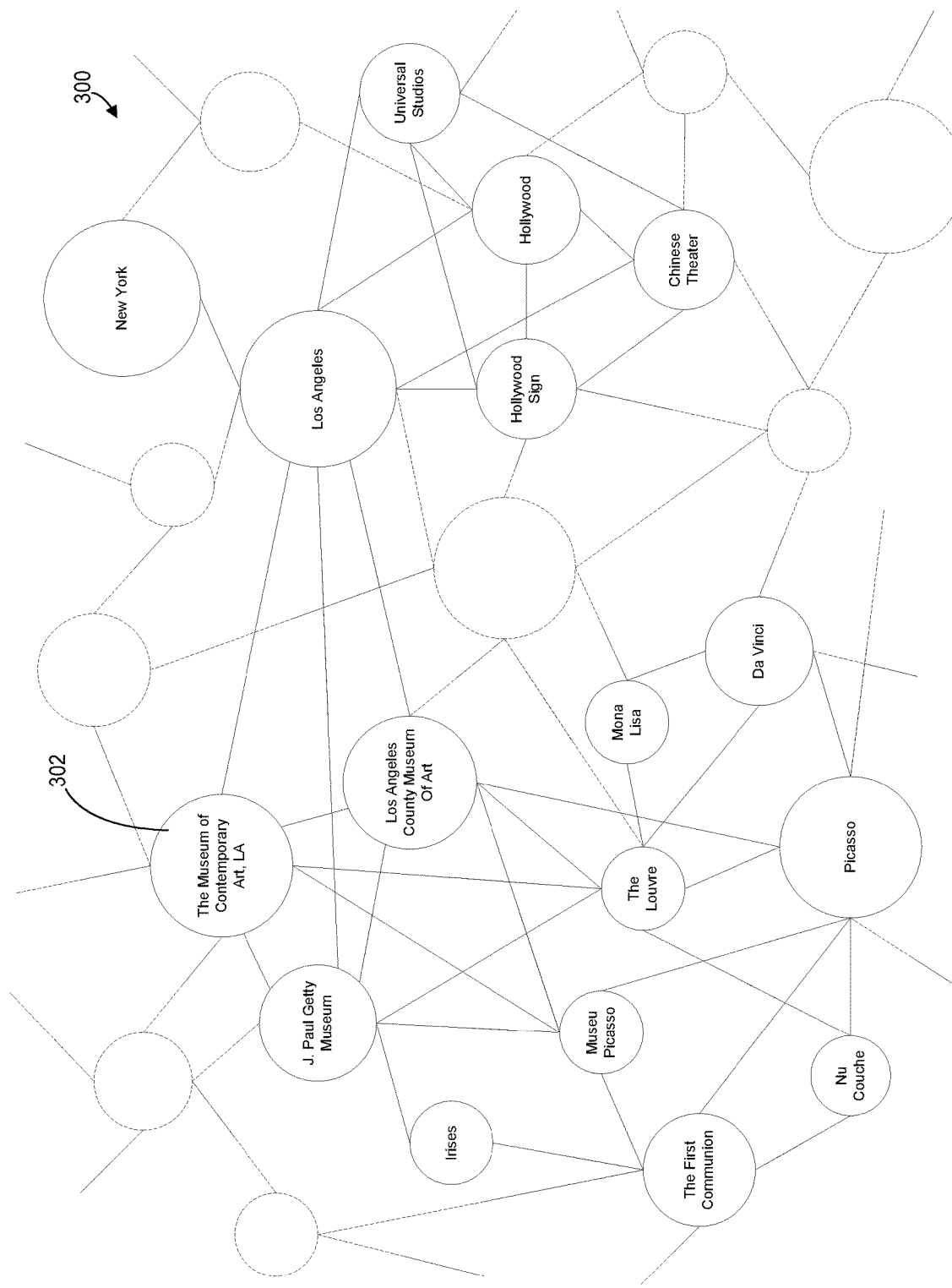
FIG. 2 illustrates an example organizational structure of a knowledge base which can be implemented in the computing system illustrated in FIG. 1.
Figure 3:
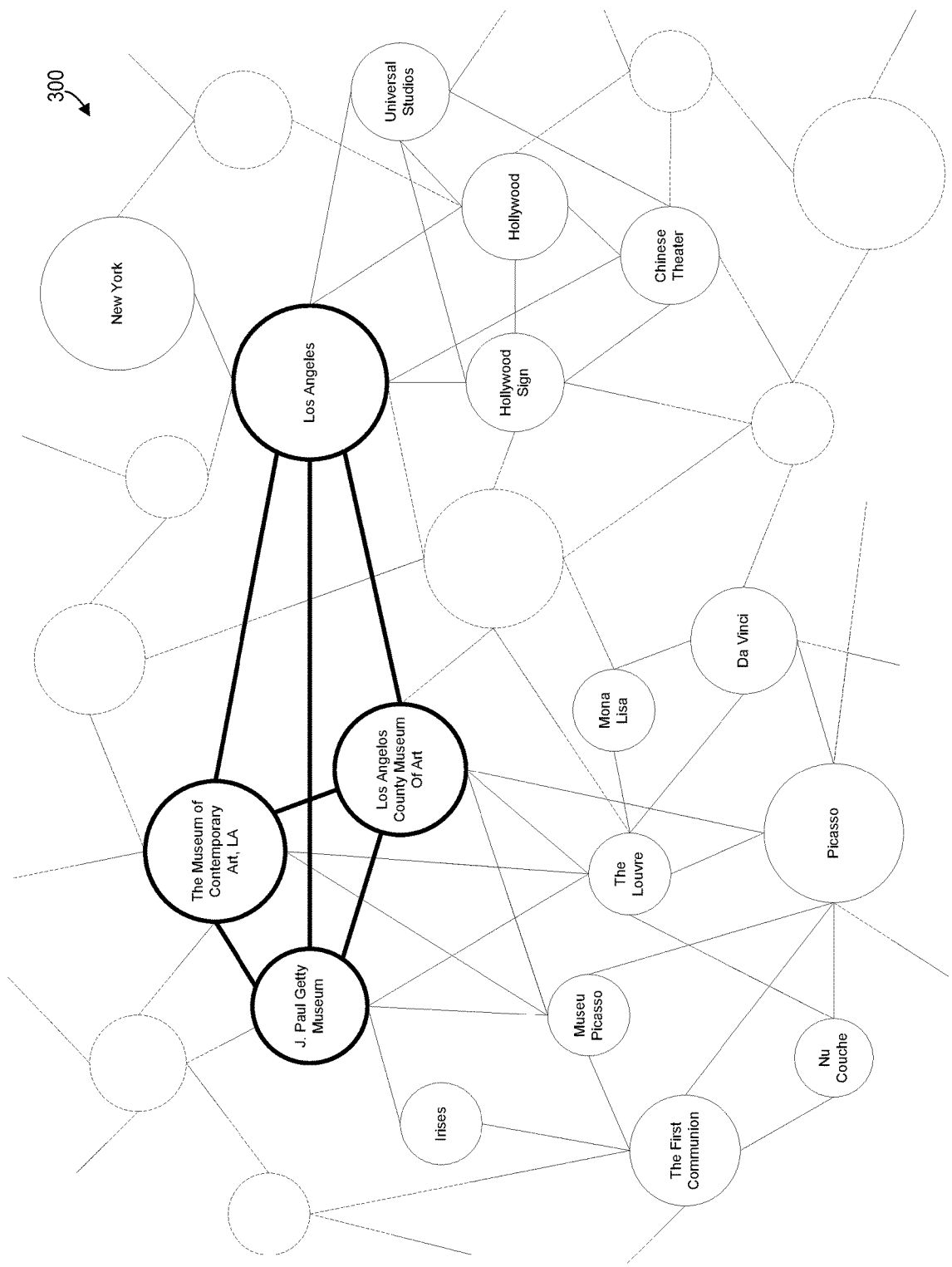
FIG. 3 illustrates an example grouping of entities within the organization structure depicted in FIG. 2.

FIGS. 2 and 3 illustrate an example knowledge base 300 that organizes connections between entities. In FIGS. 2 and 3, entities (such as objects, people, places, etc.) are represented by circles and connections between entities are represented by lines connecting the circles. For example, the entity 302 represents the Museum of Contemporary Art in Los Angeles, Calif. The example entity 302 is connected to other art museums (e.g., The J. Paul Getty Museum, The Louvre, Museu Picasso, etc.) based the semantic connection based on the shared category of art museums. The example entity 302 is also connected to the Los Angeles entity based on the semantic connection based on a common geographic area. In general, an entity within the knowledge base 300 may be semantically related to any number of other entities via any number of semantic connections.

In the scenario above, the server 101 may use the knowledge base structure 300 to determine that a noteworthy grouping of entities is "Art museums of Los Angeles" based on the fact that four of the twenty recognized entities are connected by the category of art museums and the geographic area of Los Angeles. Such a grouping is represented in FIG. 3B with bold lines representing connections within the grouping.

Upon identifying groups of entities for which semantically meaningful imagery tours may be generated, the server 101 may send to the client device 102 "compact representations" of the available imagery tours. In some implementations, a compact representation may include only an indication of the one or more entities and/or the subject of the available tour (e.g., Art Museums of Los Angeles). For example, the compact representation may provide only an indication of the available tours without any of the tour content (images, text, audio, etc.). Moreover, the server 101 may provide compact representations without generating any of the actual tour content. The server 101 in this case generates tour content only when a specific tour is selected by a user of the client device 102.

Figure 4:
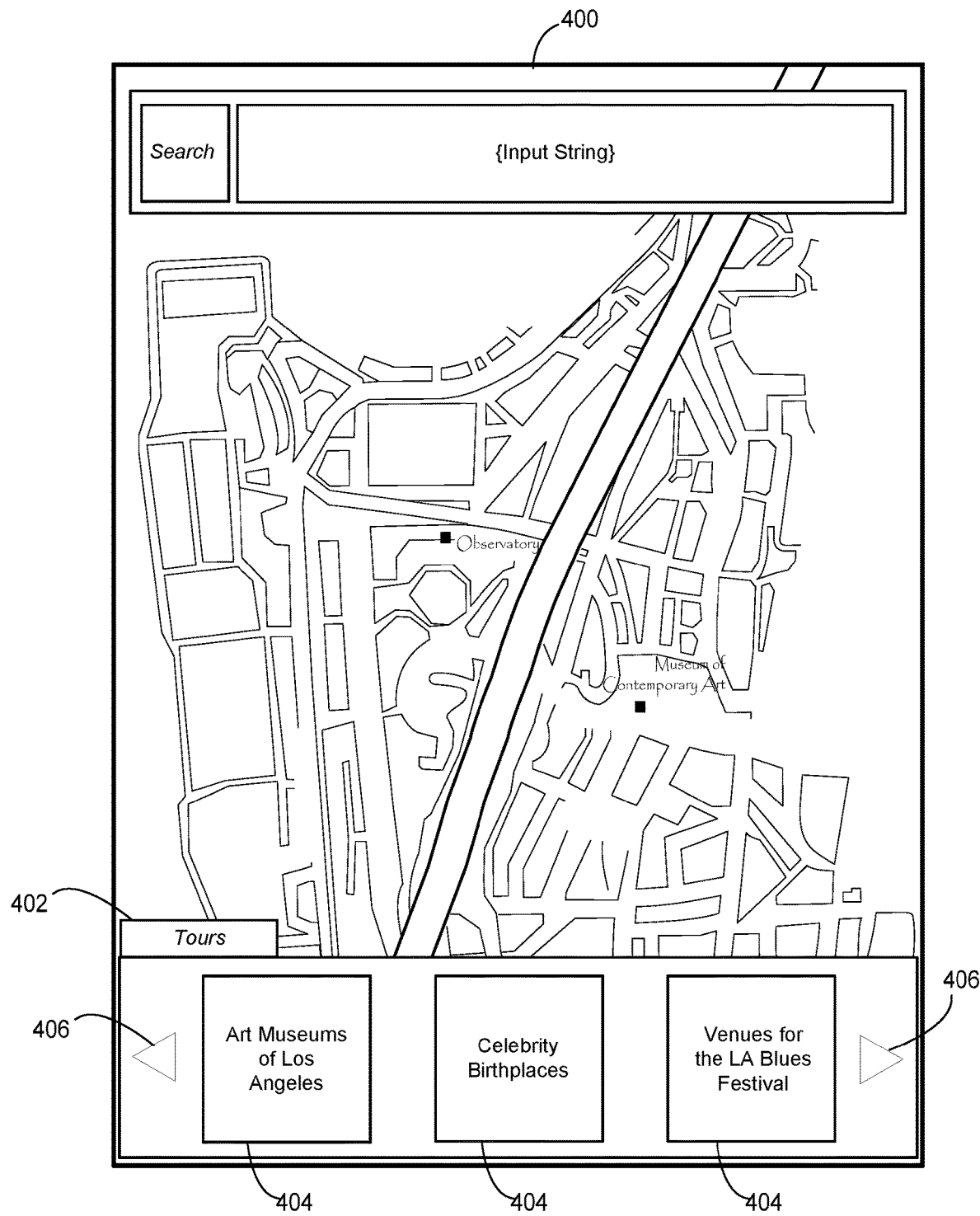
FIG. 4 illustrates an example viewport of the mapping application of FIG. 1, in which indications of available imagery tours are displayed.

FIG. 4 illustrates an example viewport 400 of the mapping application 104 in which indications of available tours are displayed. For example, the client device 102 may receive compact representations of available imagery tours and automatically display an indication of the available imagery tours. In some cases, the client device 102 may automatically display indications of available tours without an explicit request from a user.

In some implementations, the client device 102 may display indications of available imagery tours via an available tour carousel 402 on the viewport 400. For example, the available tour carousel 402 may initially display one or more available tours 404, and allow a user to scroll through other available tours via the arrow buttons 406 or via drag gestures. In some implementations, the available imagery tours may be indicated via text descriptions of tour subject, such as "Art Museums of Los Angeles" or "Celebrity Birthplaces." In yet other implementations, the compact representations of available imagery tours can overlay a digital map at the locations corresponding to the starting points of these tours, for example.

A user of the client device 102 may select (e.g., with a click or tap) one of the available tours 404 (each corresponding to a particular compact representation) from the available tour carousel 402. In response, the client device 102 may send an indication of the user's selection to the server 101. Upon receiving such an indication, the server 101 may retrieve tour content from the imagery database 134 and/or the descriptive database 136 to "expand" the corresponding compact representation into a semantically meaningful imagery tour for presentation to the user of the client device 102. The automatic generation of imagery tours for entities within a group or entities or compact representation of entities is further discussed with reference to FIG. 7.

As indicated above, semantically meaningful imagery tours may include sequences of items which a user may interactively explore, or which may be presented automatically. In one illustrative example, an imagery tour on the subject of "Art Museums of Los Angeles" may begin with an initial viewport 500 illustrated in FIG. 5. The viewport 500 may include an establishing photograph 502 overlaid with a text title 504 and configured to be displayed with representative music. A server may generate such photographic, text, and audio tour content only upon user selection of the corresponding tour (e.g., by clicking or tapping one of the available tours 404), in some implementations.

Figure 6:
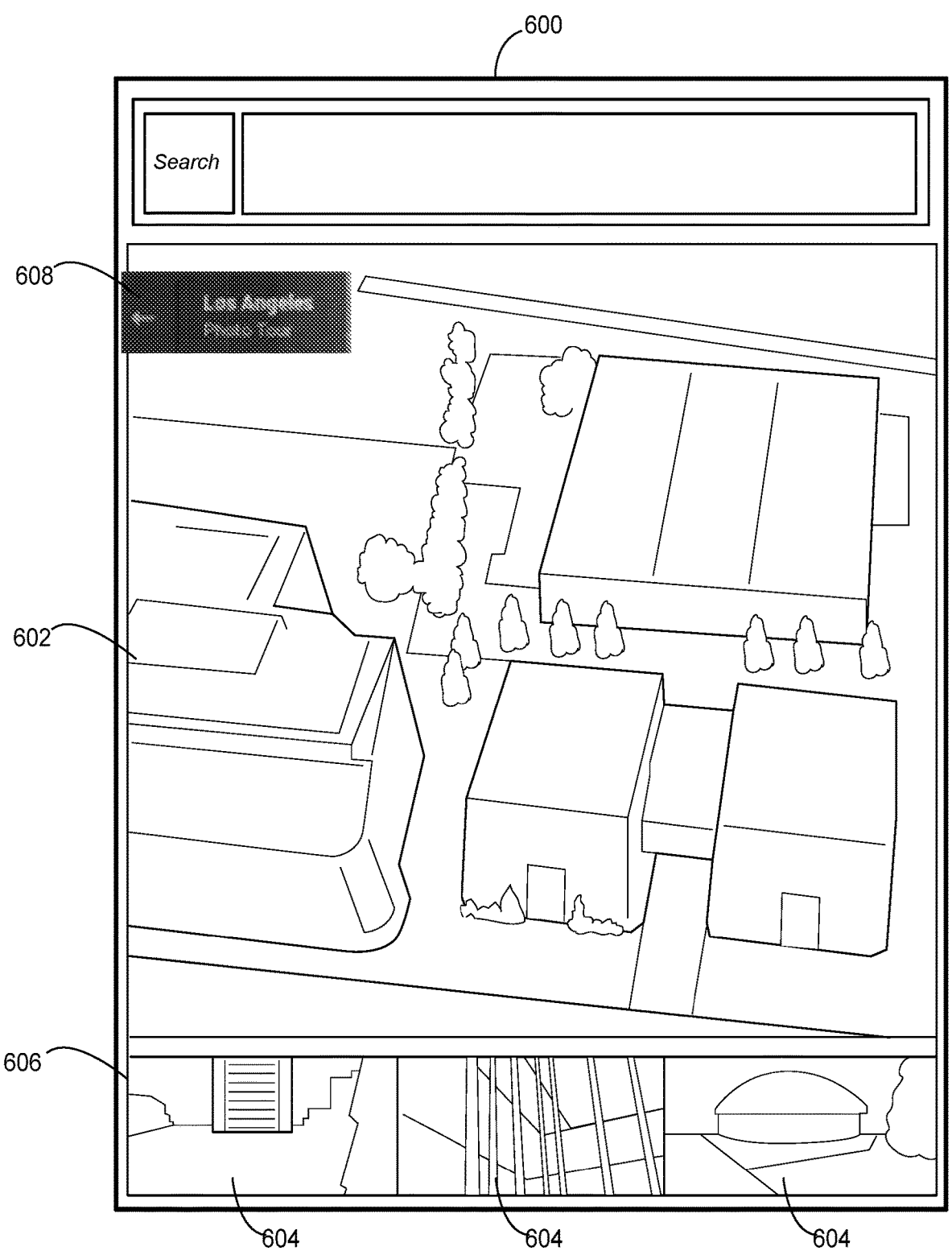
FIG. 6 illustrates another example viewport of the mapping application of FIG. 1, in which interactive tour content is displayed.

Following the viewport 500, the example imagery tour may automatically or after a user indication (e.g., tap or swipe gesture) transition from the viewport 500 to subsequent tour content displayed in a viewport 600 illustrated in FIG. 6. The viewport 600 may include a photograph 602 of a single entity within the tour, such as a particular art museum, and a plurality of selectable images 604 in an image carousel 606. In addition, a server may configure the tour content to be displayed within the viewport 600 along with an audio or text (not shown) narration describing the entity depicted in the photograph 602. Still further, the viewport 600 may include a selectable button 608 that, when selected, returns a user to a main tour menu, default window of a mapping application, or other suitable viewport.

Figure 5:
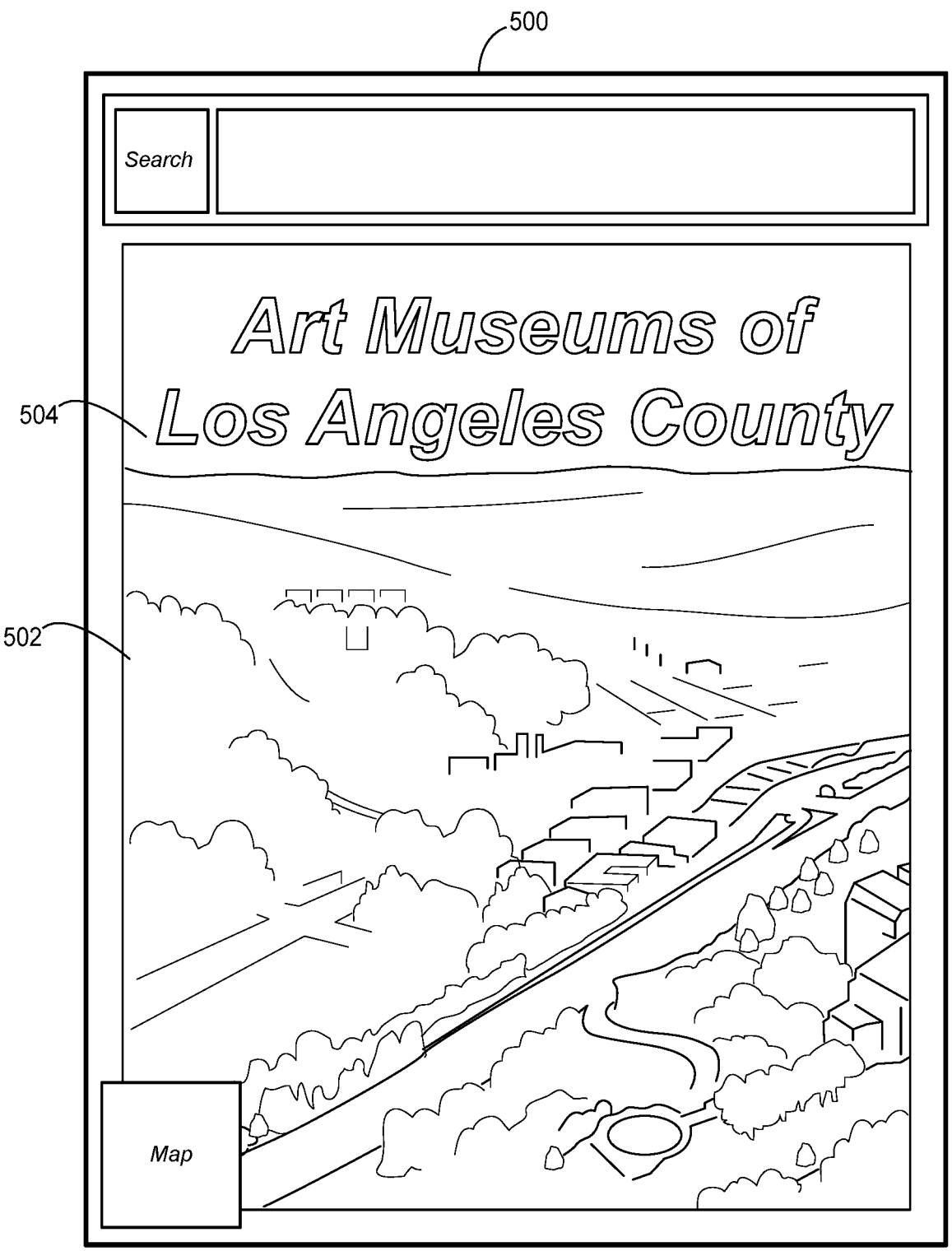
FIG. 5 illustrates another example viewport of the mapping application of FIG. 1, in which tour content is displayed.

Although only two example sequenced viewports are described with reference to FIGS. 5 and 6, an automatically generated and semantically meaningful imagery tour may include any suitable number of sequenced viewports with any suitable types of content.

Generation of Imagery Tours

FIG. 7 is a flow diagram of an example method 700 for automatically generating semantically meaningful imagery tours. For ease of illustration, the method 700 is discussed with reference to the server 101 of FIG. 1, in which the method 700 can be implemented. More generally, however, the method 700 may be implemented in any suitable computing device or a set of computing devices.

At block 702, a real-time geographic context is received from a client device. For example, referring back to FIG. 1, the server 101 may receive an indication of a current viewport, device location, current time, user profile, and/or recent geographic queries from the client device 102. Using this information, the server 101 may infer a geographic location (e.g., latitude and longitude), geographic area (e.g., defined via a bounding box), and/or conceptual geographic area (e.g., neighborhood, city, state, etc.), in an implementation. For example, the client device 102 may send an indication of a device location to the server 101 that indicates that the client device 102 is at (41.879464, −87.624089) latitude and longitude, respectively, assuming the user consents to such use of the data. Subsequently, the server 101 may use this location along with data in the map database 130 to determine that the mobile device is in "The Loop" neighborhood of Chicago, Ill., USA.

The server 101 may receive real-time geographic contexts from client devices periodically or at any suitable time, in an implementation. For example, the client device 102 may send a geographic context to the server 101 at periodic times, such as every minute, every hour, etc., and/or the client device 102 may send a geographic context to the server 101 at or after certain triggering event, such as geographic searches (e.g., Chicago pizza), changes in map zoom levels, user selection of certain POIs, etc. Although the server 101 may receive a real-time geographic context triggered by user interaction or including information about user interaction (e.g., geographic searches), the server 101 also may receive a real-time geographic context without any user interaction or any explicit request for imagery tours. In other words, a real-time geographic context can be generated and received at block 902 completely automatically.

Next (block 704), geographically related entities matching the real-time geographic context are identified, ranked, and grouped. For example, the server 101 may correlate the real-time geographic context with certain POIs using data from the map database 130 and/or the knowledge base 138. Entities matching the geographic context are scored, or ranked, according to semantic principles of the knowledge base 138, and the most noteworthy of the entities are grouped according to relationships, or connections, between the entities also defined in a knowledge base, in an implementation. Identifying, ranking, and grouping entities is further discussed with reference to FIG. 8.

By way of illustration and without limitation, groups of noteworthy entities matching a geographic context may include manmade/architectural landmarks, monuments, statues, museums, sporting arenas, natural landmarks (e.g., waterfalls, canyons, etc.), historical locations (e.g., battlefields, historical figure birthplaces, architectural sites, etc.), famous restaurants, current or past event venues (e.g., music festival, protest, rally, etc. venues), famous neighborhoods (e.g., Las Vegas Strip, New York Times Square, etc.), amusement/theme parks, government building/infrastructure, transportation attractions (e.g., boats, trains, etc.), academic institutions, religious institutions or sites, animal parks, etc. In general, a server may form groups of entities from any suitable geographically related entities with corresponding links, relationships, or connections in the knowledge base 138.

Further, a server may form groups of entities including certain numbers of entities (e.g., five to ten entities) based on tour duration (e.g., one minute), in some implementations. For example, a server may form groups of a maximum of six entities such that resulting tours will last, at most, one minute (e.g., with ten seconds allotted for each entity) when displayed on a client device. Alternatively, a server may form groups of entities with a certain number of entities based on a times allotted to tour content types. In one scenario, an example server may group entities such that resulting tours are, at most, two to three minutes in length with thirty seconds for three-dimensional content (e.g., building models), thirty seconds for panoramic imagery, and one minute for sequenced images.

Returning to FIG. 7, after grouping the entities, compact representations of available tours are sent to a mobile device (block 706). For example, the server 101 may generate an HTTP message for each, some, or all of the groups of entities from block 704, such that each message includes an indication of each of the entities within a group (e.g., by address, POI identification number, name, etc.) and a subject of the group. In some implementations, the subject of a group, or imagery tour, is generated based on the semantic principles linking entities in the group or tour. For example, if entities of a group are grouped together because the entities are all art museums and all the entities are located in Los Angeles, Calif., then the server may automatically generate a subject entitled "Art Museums of Los Angeles."

In general, the subject of a tour may be generated based on any number of semantic principles in the knowledge base 138. For example, the subject may be simply "Celebrity Birthplaces" for a group of entities related by the single fact that the entities are celebrity birthplaces. However, another group of example entities by be connected by a geographic area corresponding to the Rocky Mountains, a geographic area corresponding to Colorado, and a type of attraction corresponding to ski resorts. In such a case, the server may use all three semantic principles to generate the subject entitled "Ski Resorts of the Colorado Rocky Mountains."

In some implementations, a server may determine themes or subjects for geographic imagery tours using text-based concept templates. For example, the sever 101 may retrieve concept templates from the template database 132 in the form of text paired with substitutive variables. In one scenario, the server 101 may retrieve a concept template in the form "${CATEGORY} of ${PLACE}," where the ${ . . . } notation indicates substitutive variables, and the server 101 may substitute semantically meaningful information from the knowledge base 138 in place of the variables. For example, the server 101 may fill the template "${CATEGORY} of ${PLACE}" with a category of art museums and a place of Los Angeles, Calif. to form a subject "Art Museums of Los Angeles." In general, templates in a template database may include any number of variables that may be substituted with information from the knowledge base 138.

After generating and sending compact representations, an indication of a tour selection is received (block 708). In some implementations, the indication of a tour selection is an indication that a user has selected one of the available tours sent to the client device 102 as a compact representation. For example, a user may select one of the available tours 404 displayed on the client device 102, and the client device 102 may send an indication of the selected tour to the server 101.

Next (block 710), tour content is generated for the selected imagery tour. In some implementations, the tour content may include sequenced tour items with a variety of types of digital content. For the example "Art Museums of Los Angeles" tour, each of the art museums may have corresponding tour items, where each tour item includes photographs, text descriptions, 3D model transitions between photographs (e.g., virtual fly-over or walkthrough transitions between photographs), etc. to help a user visualize one or more features of each art museum. In some implementations, text, audio, or image data from a knowledge base, or other suitable source may be arranged via templates from a template database. For example, FIGS. 5 and 6 may each represent a respective tour item. First, FIG. 5 may represent an initial tour item in a sequenced tour, where the initial tour item includes imagery, audio, and text content. Next, FIG. 6 may represent a second tour item in the sequenced tour, where the second tour item includes imagery, text, interactive buttons, etc. content.

In some implementations, tour content for each sequenced tour item in an imagery tour may be generated "on-the-fly." That is, tour content for a specific tour item may be generated only upon a transition from a previous tour item to the specific tour item. For example, the server 101 may only generate tour content (images, text, etc.) to be displayed in the viewport 500 upon user selection of one of the available tours 404. Likewise, the server 101 may only generate tour content (interactive buttons, images, text, etc.) to be displayed in the subsequent tour viewport 600 after a user indicates a transition to the next tour item (e.g., with a click or tap) or after a certain pre-determined amount of time displaying the viewport 500, for example.

Such on-the-fly generation of sequenced tour content may allow the memory utilization of the server 101 or the client device 102 to remain low as compared with loading an entire pre-rendered sequence of tour content. However, in general, the server 101 may generate all tour content for an automatically generate imagery tour upon user selection of an available tour, or a server may generate any suitable amount of tour content upon user selection of an available tour. The server 101 may also send any suitable amount of generated tour content to a mobile device upon user selection of an available tour.

In some implementations, text-based tour content is generated by filling templates from a template database, such as template database 132, with subject-relevant facts or information from a knowledge base. By way of example, the server 101 may generate a tour item including a text description, where the text description is generated from a template of the form: "We explore five noteworthy ${PLACE_TYPE} in ${LOCATION}. Click the screen any time to learn more. We begin our tour in ${ENTITY_NAME}." In such an example, the server 101 may fill or substitute the variables ${PLACE_TYPE}, ${LOCATION}, and ${ENTITY_NAME} with a respective place type (e.g., art museums, battlefields, etc.), location (e.g., Los Angeles, Pennsylvania, etc.), and entity name (e.g., LACMA, Gettysburg, etc.).

In another example, the server 101 may generate a tour item within a sequenced tour of art museums at least partially using a text template of the form: "Built in ${DATE}, the ${VALUE} collection in ${PLACE} includes exhibits of ${ARTWORK} and ${ARTWORK}." In such an example, the server 101 may fill or substitute the variables ${DATE}, ${VALUE}, ${ENTITY_NAME}, and ${ARTWORK} with a respective date (e.g., 1959), value (e.g., Smith, Creative Art Foundation, etc.), entity name (e.g., LACMA), and artwork name (e.g., The Last Supper, etc.). In general, a text-based template may include any number and type of substitutive variables which can be filled with subject-relevant facts from a knowledge base.

Moreover, in some cases, the server 101 may utilize non-text-based templates to automatically generate tour content for imagery tours. For example, the server 101 may utilize: (i) image-based templates specifying image sizes, orientations, playback formats (e.g., for video images), and positions within a viewport; (ii) audio-based templates specifying start and end times of narration or background music; or (iii) multi-format templates specifying properties, formats, positions, etc. of text, image, and/or audio tour content. In general, the server 101 may generate any portion of tour content based on one or more templates in a template database combined with digital content from a knowledge base.

After tour content is generated, the tour content is sent to the client device 102 for display. The server 101, for example, may send tour content for a current tour item to the client device 102 via an HTTP message or multiple HTTP messages. In some cases, a server may send tour content to a mobile device using a propriety or specially develop protocol for mapping application, or a combination of such a protocol with generic protocols, such as HTTP.

Figure 8:
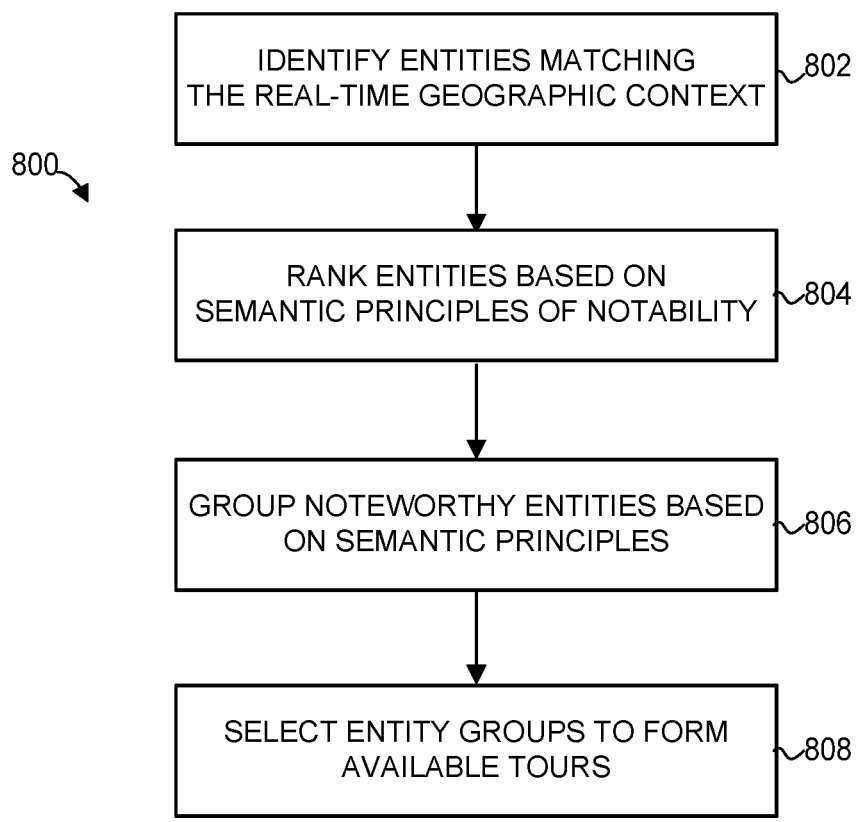
FIG. 8 is a flow diagram of an example method for identifying, ranking, and grouping entities for imagery tours which also can be implemented in the server operating in the system of FIG. 1.

FIG. 8 is a flow diagram of an example method 800 for identifying, ranking, and grouping entities for an imagery tour. The method 800 may be implemented by the server 101, for example, and may a part of the example method 700.

To begin, entities matching a real-time geographic context are identified (block 802). For example, the imagery tour generation routine 140 may receive a real-time geographic context indicating a specific geographic location or area, and may execute a query of the map database 130 to identify entities matching that specific geographic location or area. Matching, in some implementations, may be defined by entities within a certain distance of a location indicated by the real-time geographic context, entities within a certain geographic bounding box indicated by the real-time geographic context, or any other suitable condition.

In some implementations, entities matching both a real-time geographic context and/or a user profile are identified as possible "tour-able" entities (in such cases, the embodiments may require that, in order to use this profile information, the user select certain settings and/or install certain applications). For example, the server 101 may use a user history of geographic queries, a current geographic query, or other user-specific data to identify entities specifically relevant to a user of the client device 102, assuming a user consents to such use of the data. In one scenario, a user of the client device 102 may frequently search for sushi restaurants within the mapping application 104. As such, the server 101 may identify all sushi restaurants matching a real-time geographic context or closely related to a real-time geographic context as tour-able entities, for example. In another scenario, a user of the client device 102 may be executing a geographic query for "pizza" within the mapping application 104, and the server 101 may identify nearby, and/or noteworthy, pizza restaurants matching the geographic query.

Still further, the server 101 may query any suitable web service or database to identify event or other temporal entities (e.g., venues of music festivals, political rallies, etc.) both related to a real-time geographic context and related to a current timestamp. For example, the server 101 may query a web service, such as an online repository of local events, to identify temporal entities within a certain time window (e.g., ±10 days) of a current timestamp. In one scenario, the server 101 may identify a location of a political rally occurring three days after a current timestamp, or, in another scenario, the server 101 may identify all venues of a blues music festival currently occurring near a location indicated by a real-time geographic context.

Next (block 804), entities identified at block 802 are ranked according to semantic principles of notability, as defined in the knowledge base 138. For example, the server 101 may query the knowledge base 138 for information regarding each of the entities identified at block 802. As a result of the query of the knowledge base, the type (landmark, monument, tourist site, event venue, etc.) of each of the entities may be identified, and the imagery tour generation routine 140 may assign a score (e.g., one to one hundred with one hundred being most noteworthy) to each of the entities indicating a relative amount of notability, in an implementation.

In one scenario, for example, identified entities may include a fast food restaurant and a presidential monument as indicated by querying the knowledge base 138. As such, the imagery tour generation routine 140 may assign a score of eighty-five to the presidential monument and a score of seven to the fast food restaurant. The scoring or ranking of entities may be based on pre-defined rules stored in either a database, knowledge base, or local memory, in an implementation. For example, the rules may be as simple as "Monument entities receive a score of eighty-five," or the rules may be more complicated with some rules containing dependencies (e.g., "If the entity is a Monument and . . . ", "If the real-time geographic context is . . . and the entity is a Monument . . . ", etc.).

In some implementations, the scoring or ranking of identified entities involves an analysis of user profile data, assuming a user consents to such use of the data. For example, the imagery tour generation routine 140 may identify certain types of entities (e.g., battlefields) that are particularly relevant to a specific user profile. A certain user may have frequently performed geographic searches for battlefields in the recent past, and, therefore, the imagery tour generation routine 140 may rank battlefield entities as very noteworthy (e.g., a score near one hundred) as compared with other types of entities. Further, a user profile may indicate a preference for walking as opposed to driving, and, therefore, the imagery tour generation routine 140 may rank entities within walking distance higher than entities requiring another form of transportation, for example. In such cases, the embodiments may require that, in order to use such profile data, the user select certain settings and/or install certain applications.

Next (block 806), the ranked entities are grouped according to information within a knowledge base. For example, the server 101 may utilize the knowledge base 138, having a structure similar to that illustrated in FIGS. 3A and 3B, to identify relationships or connections between the ranked entities and group entities according to those relationship or connections. In one example scenario, the imagery tour generation routine 140 may group entities together because they are related by geographic area (e.g., Los Angeles, New York, etc.) and by category (e.g., art museums, theaters, etc.). In another example scenario, the imagery tour generation routine 140 may group entities together because the they are related by geographic area, category, and connections to historical figures (e.g., Boston pubs frequented by the founding fathers). In general, groups of entities may be connected or related in any number of ways, and, in some cases, identified and ranked entities may be grouped in multiple different ways.

In one implementation, the server 101 may group entities according to all possible semantically meaningful groups, and, in other implementations, the server 101 may only group entities according to the most noteworthy groupings. For example, the server 101 may determine that certain entities may are related by the geographic area of Chicago, the category of skyscrapers, the type of construction of steel, and the decade of construction of the 1980s. At the same time, other entities may be related by just the type of construction of steel, and the decade of construction of the 1980s. As such, the server 101 may form a group of entities based on a semantic principle "Skyscrapers of Chicago," or the server 101 may form a larger group of entities based on a semantic principle "Steel buildings constructed in the 1980s." In one scenario, the server 101 may form both groupings, but, in other scenarios, the server 101 may ignore the grouping "Steel building constructed in the 1980s" based on a low level of relative notability compared with "Skyscrapers of Chicago" (e.g., determined by adding or otherwise combining scores determined at block 804).

After grouping, a subset of the groups may be selected to form available imagery tours (808). In some implementations, the server 101 determines groups for which imagery tours can be generated based on a combined notability score for the respective groups. For example, the imagery tour generation routine 140 may calculate an average notability score for each of the groups generated at block 806 based on individual notability scores generated at block 804. Alternatively, the imagery tour generation routine 140 may calculate a summed notability score for each of the groups generated at block 806. The server 101 may then rank the groups of entities by the combined notability score and select a certain number of groups to form the available imagery tours, in an implementation. For example, the server 101 may choose the top five most noteworthy groups to form the available imagery tours, or the server 101 may choose only groups with an average notability score of above sixty to form the available imagery tours.

In some implementations, the server 101 may also choose available imagery based at least partially on the amount and diversity of data available for each of the groups. In one scenario, a noteworthy grouping of entities may have only one corresponding type of data (e.g., images) available in a database (e.g., in imagery database 134). Whereas, a less noteworthy grouping may have many corresponding types of data (e.g., images, text, audio, videos, annotations, etc.) available. In such a case, the server 101 may select a less noteworthy grouping of entities before a more noteworthy grouping of entities based at least partially on the diversity of data available. In such a way, a server may generate semantically meaningful and diverse tours, in an implementation.

Presentation of Imagery Tours

Figure 9:
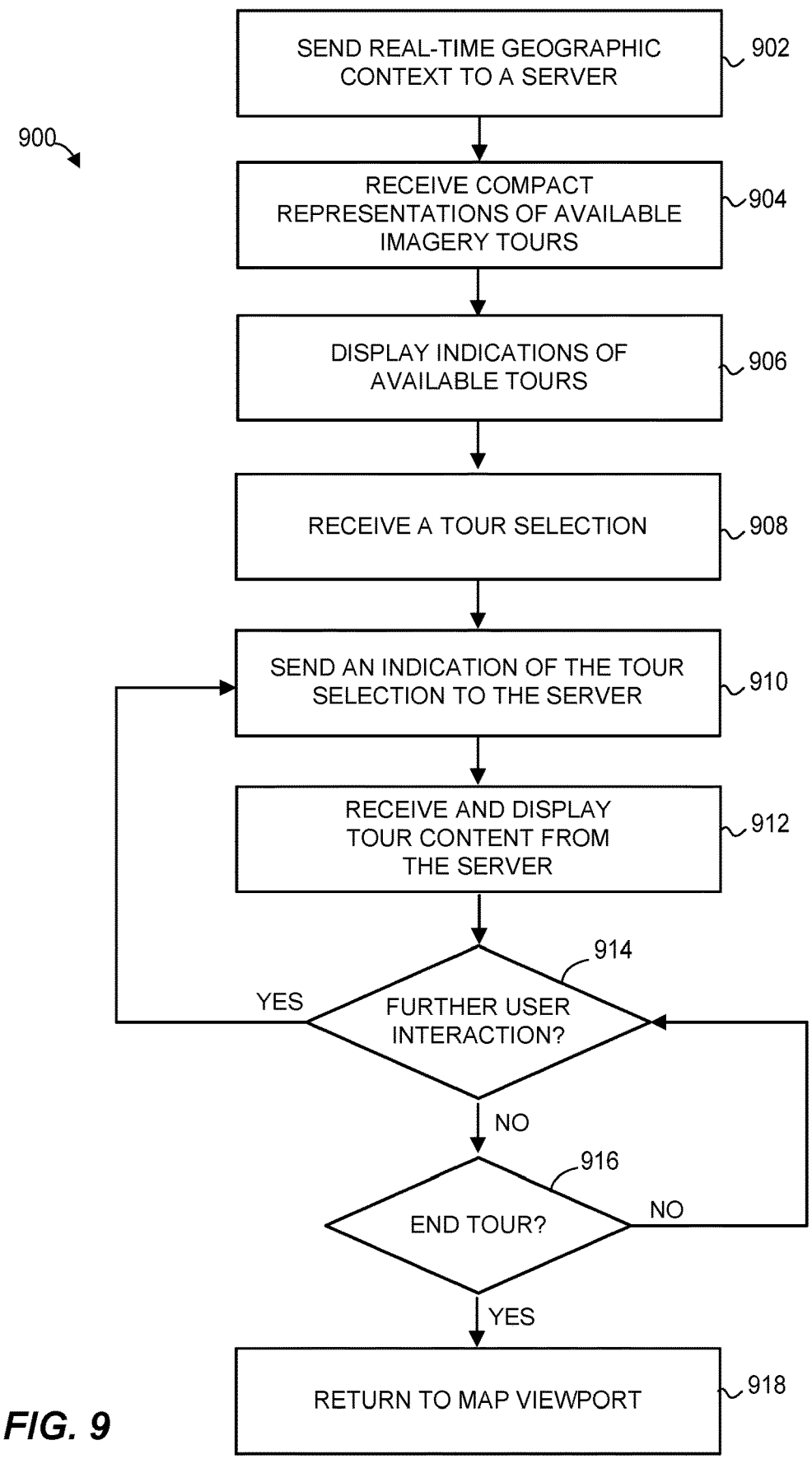
FIG. 9 is a flow diagram of an example method for requesting, displaying, and interacting with an imagery tour, which can be implemented in the client device illustrated in the system of FIG. 1.

FIG. 9 is a flow diagram of an example method 900 for requesting and displaying automatically generated imagery tours. Similar to the methods of FIGS. 7 and 8, the example method 900 is discussed with reference to the system of FIG. 1, in which the method 900 can be implemented. More generally, however, the method 900 may be implemented in any suitable computing device or a set of computing devices.

At block 902, a real-time geographic context is sent to the server 101. For example, the client device 102 may send the server 101 a real-time geographic context including a geographic location, indication of a geographic area, location of the client device 102, timestamp, and/or indication of a current viewport. In some implementations, the client device 102 may send the real-time geographic context to the server 101 via an HTTP message, or the client device 102 may utilize a proprietary or application specific protocol along with the HTTP protocol.

Next (block 904), compact representations of available imagery tours are received. In some implementations, compact representations of imagery tours may include an indication of tour subjects and/or indications of entities included in each available tour. For example, the client device 102 may receive compact representations from the server 101, where the compact representations indicate, among other tours, a tour of "Venues of this week's Blues Festival" and a tour of "Famous pizza restaurants." Further, the compact representations may include indications of entities corresponding to the "Venues of this week's Blues Festival" tour (e.g., Chicago Blues Theater, Blues Bar and Grill, etc.) and to the "Famous pizza restaurants" tour (e.g., Frank's Pizza, Downtown Pizza Shop, etc.). The compact representations may be received from a server in any appropriate form, such as text, symbols, identification number, code, etc.

Upon receiving compact representations, indications of available tours are displayed on a display device of the client device 102 (block 906). For example, the client device 102 may display indications of available tours as text-based tour subjects within a tour carousel, such as the available tour carousel 402 illustrated in FIG. 4. In general, however, indications of available tours may be displayed in any appropriate manner on the client device 102. For example, the client device 102 may display a text-based subject for each tour along with a bulleted list of some of the entities within the respective tour. Alternatively, an image-based indication of each available tour can be displayed, in an implementation. For example, the client device 102 may display a representative image for some of the available tours, or the client device 102 may display a representative overlaid with a text-based subject for the tour.

In some implementations, the indications of the available tours are selectable and/or interactive. For example, the user interface 120 of the client device 102 may include a touchscreen, and indications of available tours may be selectable via a tap or other gesture on the touchscreen. Further, the indications of available tours may allow a user to "expand" an indication to view more information about a certain available tour. For example, a user of the client device 102 may use a swipe or pull gesture to expand one of the available tours 404 (displaying only a subject of a tour) such that a text-based descriptions of entities within that tour are presented to the user.

Next (block 908), a user selection of a particular available imagery tour is received. For example, the client device 102 may receive a user selection (e.g., via a click or tap) of one of the example available tours 404. Subsequently, an indication of the selection of the available tour is sent to the server. In some implementations, each available tour may be identified by an identification number or text/symbol-based title. For example, the client device 102 may send an identification number corresponding to one of the selected available tours 404 to the server 101 via an HTTP request.

At block 912, tour content for the selected imagery tour is received from the server 101 and displayed on a mobile device. In some implementations, tour content is sent to the client device 102 "on-the-fly" so that only initial portions of tour content are sent to the client device 12. For example, the client device 102 may receive tour content for only an initial tour item, where the imagery tours includes multiple sequenced tour items. Content for each subsequent tour item may be received only after a mobile device requests tour content for the subsequent tour item, in an implementations. Moreover, the request for subsequent tour content may or may not require user interaction, in some cases. For example, the client device 102 may automatically request more tour content after current tour content has been displayed for a certain amount of time (e.g., fifteen seconds), or the client device 102 may request more tour content after a user selects a button to transfer to the next tour item.

In some implementations, a tour item may include a variety of types of digital content (e.g., images, text, audio, etc.) to be displayed at various times and/or in various positions. In an example scenario, the client device 102 may display a tour item which initially display a picture with background music and then overlays a text-based description or title. In another scenario, the client device 102 may display a tour item which maintains a background pictures while transferring between multiple text-based description and selectable icons. Such multi-part or multi-content tour items may be generated with templates and/or with semantic principles of a knowledge base, as further discussed with reference to FIG. 7.

At block 914, it is determined if a user chooses to interact with the displayed imagery tour or requests further tour content. For example, a user of the client device 102 may request a transfer to another tour item, or a user of the client device 102 may interactive portions of an imagery tour requiring further tour content. If such user interaction is received, the flow reverts to block 910 where requests for further content may be sent to a server. However, if no such user interaction is received, the flow continues to block 916.

In some implementations, a user may interactively explore entities within one or more tour items such that the user may "drill down" to receive more information about entities. In one example scenario, the client device 102 may display a tour item including an interior image of an art museum with multiple painting on the walls of the museum. The painting within the image may be selectable, and a user may click or tap one of the painting to receive more information about the work or the artist, for example. Further, text-based descriptions of the painting or artist may include selectable links to online resources devoted to the particular artist, in the scenario.

Such drill down interactively may require a mobile device to request further tour content from a server, where the server generated the further tour content on-the-fly, in some implementations. In general, tour items may include any number or interactive elements (e.g., areas, buttons, scroll bars, etc.) that allow a user of a mobile device to drill down to information on any number of levels of detail. For example, at a highest level a tour item may display digital content related to a venue of a Music Festival. Subsequently, in the example scenario, a user may drill down (e.g., with a tap or swipe gesture) to information about a band playing at the venue of the Music Festival, band member biographies, information about related bands, etc.

At block 916, it is determined whether a display tour is at an end and should be terminated. In some implementations, a display imagery tour may be terminated if no user interaction is received for a pre-determined amount of time. For example, the client device 102 may end an imagery tour if a user does not interact (e.g., select icons, transfer to the next tour item, etc.) with the imagery tour after two minutes. In addition, a display imagery tour may end upon reaching the last tour item in an imagery tour with sequenced tour items. For example, a last tour item may be displayed, and upon a user requested further tour content (e.g., via a swipe gesture) the viewport may be returned to a mapping viewport (block 918).

However, if it is determined that an imagery tour should not be ended, the flow reverts to block 914 where further user interaction may be detected. In some implementations, an imagery tour may transition from one tour to other tours or other nested digital content (e.g., hyperlinks, drill down information, etc.) without a need to end or exit the tour (i.e., the transition is seamless). As such, an imagery tour may, in some cases, be displayed as long as a user is interacting with the tour and the server 101 is generating tour content.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols,"

"characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for automatically generating image tours through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method in a computing system for automatically generating a geographic imagery tour, the method comprising:

determining, by one or more computing devices, a real-time geographic context indicating a geographic area for a client device according to a current viewport of the client device;

identifying, by the one or more computing devices, one or more groups of tour-able entities from among a set of entities stored in a non-transitory computer-readable knowledge repository, each entity in the set of entities being a place of interest (POI) having a shared relevance to the geographic area, each entity in the identified one or more groups of tour-able entities is grouped based on a score assigned to each entity in the set of entities, wherein the score is based on a further shared relevance of each entity to a temporal entity corresponding to the geographic area; and generating, by the one or more computing devices for presentation by the client device, one or more compact representations, each compact representation of the one or more compact representations corresponding to each group of tour-able entities of the identified one or more of groups of tour-able entities;

receiving, by the one or more computing devices, an input corresponding to a selection a first compact representation of the one or more compact representations, the first compact representation representing a first group of tour-able entities of the identified one or more group of tour-able entities;

generating, by the one or more computing devices for presentation by the client device, the geographic imagery tour including a visual representation of each entity of the first groups of tour-able entities of the first compact representation.

2. The method of claim 1, wherein the one or more groups of tour-able entities are further identified according to a tour duration for the geographic imagery tour.

3. The method of claim 1, wherein, prior to generating the geographic imagery tour, the method includes sending the one or more compact representations of the identified one or more groups of tour-able entities to the client device, the compact representation providing an indication of the available geographic imagery tour without including tour content.

4. The method of claim 1, wherein the geographic imagery tour is generated in response to a request received from the client device, and the request received from the client device includes an indication of a tour selected from the compact representation.

5. The method of claim 3, wherein generating, the compact representation includes generating the compact representation to includes the indication of the availability of the geographic imagery tour without including images, text or audio content of the geographic imagery tour.

6. The method of claim 1, wherein tour content for each identified tour-able entity is generated only upon transition from a previous tour item to a current tour item, wherein the transition includes receiving a selection of a next tour item or upon reaching a pre-determined amount of time displaying the current viewport.

7. The method of claim 6, wherein the tour content includes one or more of interactive buttons, images, text and audio information.

8. The method of claim 1, further comprising dynamically adjusting the geographic imagery tour upon adjustment of the current viewport to a different viewport.

9. A computing device for automatically generating a geographic imagery tour, the computing device comprising one or more processors configured to:

determine a real-time geographic context indicating a geographic area for a client device according to a current viewport of the client device;

identify one or more groups of tour-able entities from among a set of entities stored in a non-transitory computer-readable knowledge repository, each entity in the set of entities being a place of interest (POI) having a shared relevance to the geographic area, each entity in the identified one or more groups of tour-able entities is grouped based on a score assigned to each entity in the set of entities, wherein the score is based on a further shared relevance of each entity to a temporal entity corresponding to the geographic area;

generate for presentation by the client device, one or more compact representations, each compact representation of the one or more compact representations corresponding to each group of tour-able entities of the identified one or more of groups of tour-able entities;

receiving an input corresponding to a selection a first compact representation of the one or more compact representations, the first compact representation representing a first group of tour-able entities of the identified one or more group of tour-able entities; and generate, for presentation by the client device, the geographic imagery tour including a visual representation of each entity of the first groups of tour-able entities of the first compact representation.

10. The computing device of claim 9, wherein the several one or more groups of tour-able entities are further identified by the one or more processors according to a tour duration for the geographic imagery tour.

11. The computing device of claim 9, wherein, prior to generating the geographic imagery tour, the method includes sending the one or more compact representations of the identified one or more groups of tour-able entities to the client device, the compact representation providing an indication of the available geographic imagery tour without including tour content.

12. The computing device of claim 9, wherein the geographic imagery tour is generated in response to a request received from the client device, and the request received from the client device includes an indication of a tour selected from the compact representation.

13. The computing device of claim 11, wherein the one or more processors are wherein generating, the compact representation includes generating the compact representation to includes the indication of the availability of the geographic imagery tour without including images, text or audio content of the geographic imagery tour.

14. The computing device of claim 9, wherein tour content for each identified tour-able entity is generated by the one or more processor only upon transition from a previous tour item to a current tour item.

15. The computing device of claim 14, wherein the tour content includes one or more of interactive buttons, images, text and audio information.

16. The computing device of claim 14, wherein the transition includes receiving a selection of a next tour item or upon reaching a pre-determined amount of time displaying the current viewport.

17. The computing device of claim 9, wherein the one or more processors are further configured to dynamically adjust the geographic imagery tour upon adjustment of the current viewport to a different viewport.

18. A non-transitory computer-readable medium storing instructions for automatically generating a geographic imagery tour, the instructions, when executed by one or more computing devices, cause the one or more computing devices to perform a method of:

determining a real-time geographic context indicating a geographic area for a client device according to a current viewport of the client device;

identifying one or more groups of tour-able entities from among a set of entities stored in a non-transitory computer-readable knowledge repository, each entity in the set of entities being a place of interest (POI) having a shared relevance to the geographic area, each entity in the identified one or more groups of tour-able entities is grouped based on a score assigned to each entity in the set of entities, wherein the score is based on a further shared relevance of each entity to a temporal entity corresponding to the geographic area;

generating, for presentation by the client device, one or more compact representations, each compact representation of the one or more compact representations corresponding to each group of tour-able entities of the identified one or more of groups of tour-able entities;

receiving an input corresponding to a selection a first compact representation of the one or more compact representations, the first compact representation representing a first group of tour-able entities of the identified one or more group of tour-able entities; and generating, for presentation by the client device, the geographic imagery tour including a visual representation of each entity of the first groups of tour-able entities of the first compact representation.

19. The non-transitory computer-readable medium of claim 18, wherein, prior to generating the geographic imagery tour, the method includes sending the one or more compact representations of the identified one or more groups of tour-able entities to the client device, the compact representation providing an indication of the available geographic imagery tour without including tour content.

20. The method of claim 1, wherein the temporal entity is an event that occurred within a time window of a timestamp.

* * * * *